Figure 4:
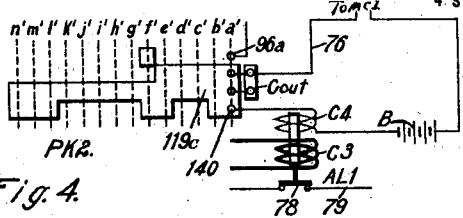

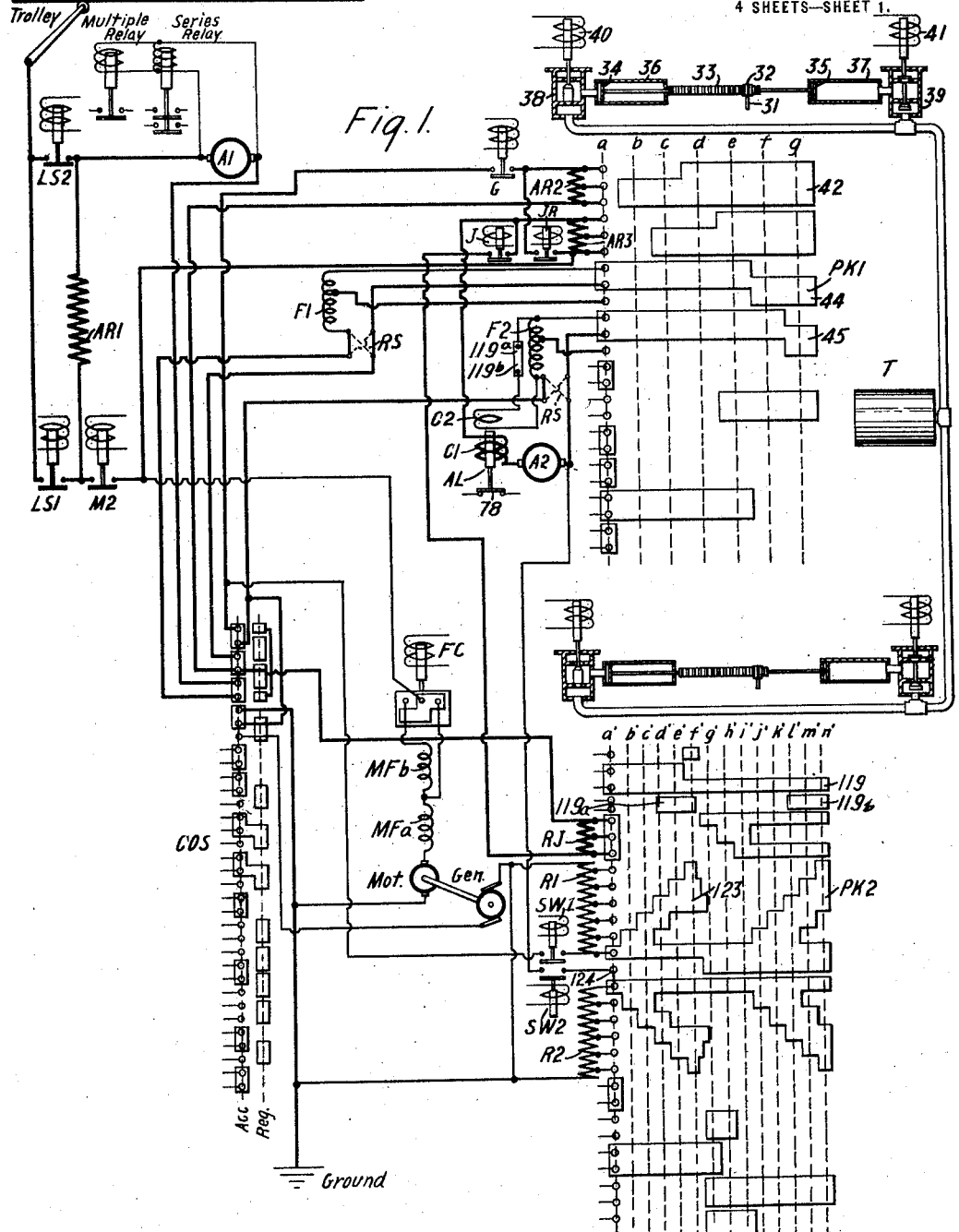

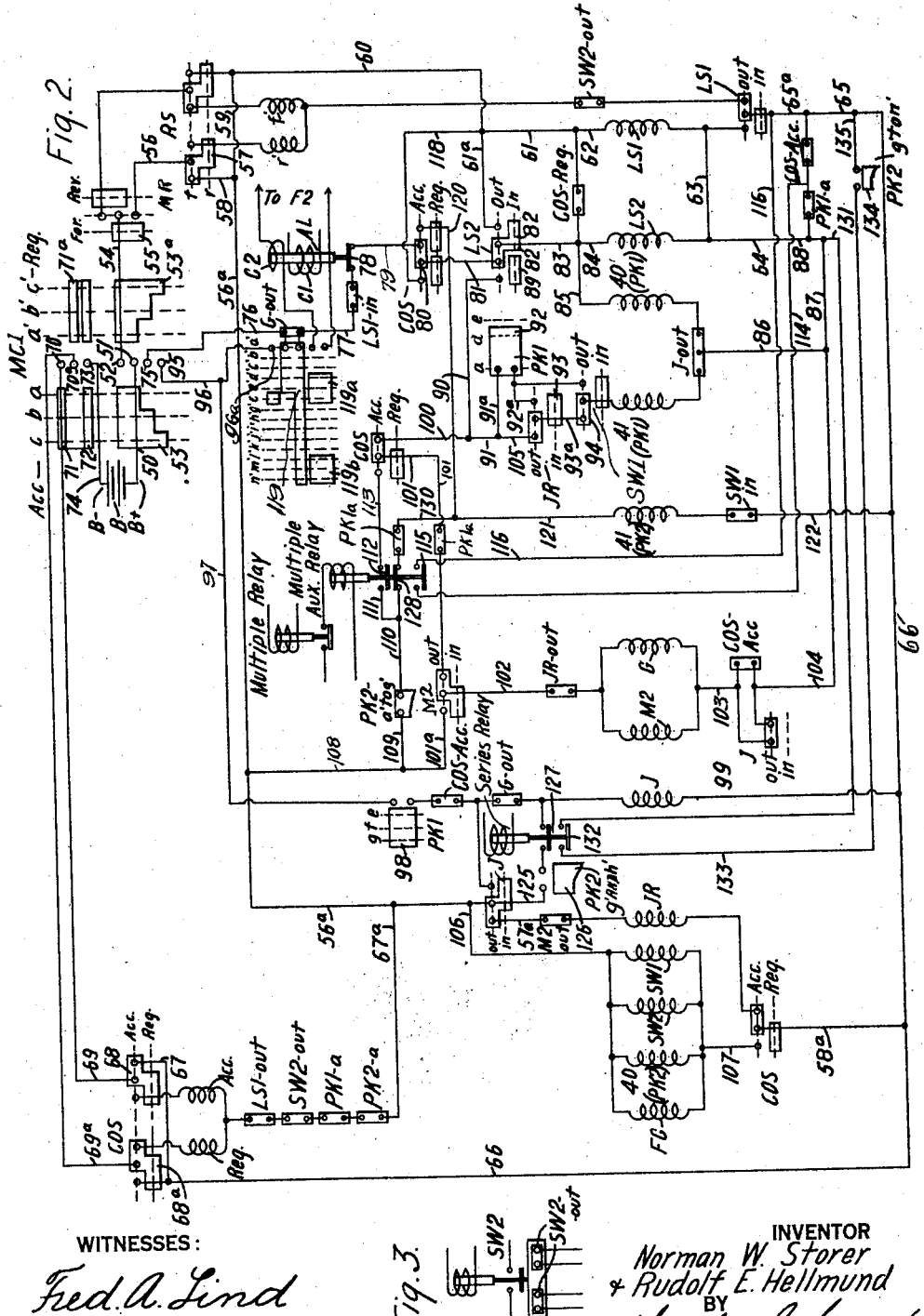

N. W. STORER AND R. E. HELLMUND.
SYSTEM OF CONTROL.
APPLICATION FILED FEB. 10, 1916.

1,393,715.

Patented Oct. 11, 1921.

4 SHEETS—SHEET 3.

WITNESSES:
R. J. Fitzgerald
W. R. Coley

INVENTOR
Norman W. Storer &
Rudolf E. Hellmund.
BY
Wesley G. Carr
ATTORNEY

N. W. STORER AND R. E. HELLMUND.
SYSTEM OF CONTROL.
APPLICATION FILED FEB. 10, 1916.

1,393,715.

Patented Oct. 11, 1921.
4 SHEETS—SHEET 4

WITNESSES:

INVENTORS
Rudolf E. Hellmund &
Norman W. Storer
BY
ATTORNEY

UNITED STATES PATENT OFFICE.

NORMAN W. STORER AND RUDOLF E. HELLMUND, OF PITTSBURGH, PENNSYLVANIA, ASSIGNORS TO WESTINGHOUSE ELECTRIC AND MANUFACTURING COMPANY, A CORPORATION OF PENNSYLVANIA.

SYSTEM OF CONTROL.

1,393,715. Specification of Letters Patent. Patented Oct. 11, 1921.

Application filed February 10, 1916. Serial No. 77,428.

*To all whom it may concern:*

Be it known that we, NORMAN W. STORER, a citizen of the United States, and a resident of Pittsburgh, in the county of Allegheny and State of Pennsylvania, and RUDOLF E. HELLMUND, a subject of the German Emperor, and a resident of Pittsburgh, in the county of Allegheny and State of Pennsylvania, have invented a new and useful Improvement in Systems of Control, of which the following is a specification.

Our invention relates to systems of control and it has special relation to the automatic regenerative control of electric railway motors and the like.

Whenever regenerative braking occurs at relatively high machine speeds, the field windings of the machines must be energized, usually in conjunction with some auxiliary source, to produce a relatively weak excitation, since, otherwise, the voltage generated by the momentum-driven armatures would be undesirably high with respect to the supply-circuit voltage. However, under such weak field-excitation conditions, it is not permissible, with all motors, to employ a relatively heavy armature current, inasmuch as excessive field-flux distortion and consequent danger of "flash-over" conditions would be liable to be effected by such heavy armature current. Consequently, it is sometimes impossible to obtain a desirably high rate of retardation under relatively high-speed machine conditions.

To obviate the difficulty just recited, means, in the form of one double-coil limit switch or a plurality of limit switches, may be employed and adjusted to automatically produce a lower armature current under high-speed conditions than under low-speed conditions.

Another condition existing in separately-excited regenerative systems is that the field-winding currents increase in value as the speed of the momentum-driven armatures and vehicle decreases. Therefore, if, as is customary practice, the armature current is automatically regulated to have a substantially constant value during the regenerative period, the braking torque or effort of the machines is also increased as the vehicle speed is reduced; or, in other words, the maximum rate of braking is utilized only under relatively low-speed conditions. In order to obtain a more uniformly high rate of deceleration, it is desirable to decrease the armature current as the field-winding current increases during the regenerative period and thus maintain a substantially constant braking effort rather than a constant armature current.

The object of our present invention is to provide relatively simple and reliable means for effecting the above-mentioned desirable results, whereby a rate of deceleration that is disproportionate to the field-winding current, or a substantially constant braking effort, if desired, may be obtained.

In the accompanying drawings, Figure 1 is a diagrammatic view of the main circuits of a regenerative control system embodying our invention; Fig. 2 is a diagrammatic view of the auxiliary governing circuits for the system that is shown in Fig. 1; Fig. 3 is a detailed diagrammatic view of one of the main circuit switches that is illustrated in Fig. 1; Fig. 4 is a diagrammatic view of a modification of a certain portion of the system that is shown in Fig. 2; and Fig. 5 and Fig 6, together with Fig. 7, are simplified diagrammatic views of certain main-circuit connections during acceleration and regeneration, respectively.

Referring to Fig. 1, the system illustrated comprises the supply circuit conductors, Trolley and Ground; a plurality of main dynamo-electric machines having armatures A1 and A2 and corresponding series-connected field-magnet windings F1 and F2; a reversing switch RS of a familiar electrically-controlled drum type, which is shown conventionally here, for the purpose of reversing the electrical relations of the corresponding armatures and field windings; a plurality of accelerating resistors AR1, AR2 and AR3; a plurality of main-circuit switches LS1, LS2, M2, JR, J, G, SW1 and SW2; a transition resistor RJ for a purpose to be described; a plurality of resistors R1 and R2 that are employed during regenerative operation of the system only; an automatically-operated controller PK1 that is adapted to occupy an off position $a$, and a plurality of operative positions b to g, inclusive, and that is preferably of the drum type, for manipulating various circuit connections during the accelerating period of the motors; a second similar controller PK2 that is adapted to occupy an off position a' and a plurality of operative positions b' to n' inclusive, and that is employed during regenerative operation only, chiefly in connection with the manipulation of the resistors R1 and R2; a limit switch AL of a type to be described, that is employed for the usual purposes; a change-over switch COS of the drum type that is adapted to occupy two positions respectively marked "Acc." and "Reg.," standing for acceleration and regeneration, respectively; an auxiliary motor-generator set or dynamotor that is employed during regenerative operation and comprises a motor armature winding Mot., a generator armature winding Gen. and a subdivided field-magnet winding having sections MFa and MFb that are connected in series-circuit relation with the armature winding Mot.; a switch FC that is employed for field control of the motor-generator; and a plurality of relays respectively marked "Series relay" and "Multiple relay" that severally have their actuating coils connected across the main armature winding A1. The usual series actuating coil of the limit switch AL is connected in the main circuit intermediate the resistor AR3 and the armature A2, thereby at all times, receiving the current that traverses the armature A2; and, in addition, a second or shunt actuating coil, that is adapted for intermittent connection across the field winding F2, is provided, as hereinafter more fully set forth.

The operating mechanisms of the controllers PK1 and PK2 are identical, each comprising a shaft 31 that is associated with the rotatable controller drum, and a pinion 32 that is attached to the upper end of the shaft 31 and is adapted to mesh with a suitable rack member 33 which has its respective ends provided with a plurality of piston members 34 and 35. The pistons 34 and 35 are respectively adapted to operate within suitable cylinders 36 and 37, the access of fluid pressure to which from a suitable tank or reservoir T, is governed by a plurality of suitable valve members 38 and 39, respectively. A plurality of actuating coils for the valves 38 and 39, respectively, are adapted to be energized during the operation of the system shown in Fig. 2, as more fully described later. The valve 38 is normally closed to exclude fluid pressure from the cylinder 36 but admits pressure thereto whenever the actuating coil 40 is energized; whereas the valve member 39 is normally open to admit fluid pressure to the cylinder 37 but is adapted to exhaust pressure therefrom when the actuating coil 41 is energized. In this way, fluid pressure is normally present in the cylinder 37 and is normally excluded from the cylinder 36, whereby the controller drum is biased to its off position, as indicated by the respective positions of the pistons 34 and 35.

The operation of the controller PK1 and PK2, so far as the mechanical apparatus just described is concerned, may be set forth as follows:

When both of the actuating coils 40 and 41 are simultaneously energized, fluid pressure is exhausted from the cylinder 37 and is admitted to the cylinder 36 to effect a movement of the controller drum through its various operative positions until the actuating coil 41 is deënergized, when balanced-pressure conditions exist in the two cylinders 36 and 37, whereby the controller drum is positively and rapidly brought to rest in any desired position. In the system illustrated in Fig. 2, the operation of the valve member 39 is controlled by the limit switch AL to automatically effect a step-by-step operation of the controller drum in accordance with the required service conditions. To return the controller drum to its off position, it is merely necessary to simultaneously deënergize both actuating coils 40 and 41, whereby fluid pressure is exhausted from the cylinder 36 and is admitted to the cylinder 37.

Reference may now be had to the auxiliary governing system that is shown in Fig. 2, which comprises the actuating coils of the various main-circuit switches and of the controllers PK1 and PK2; a master controller MC1 that is adapted to occupy a plurality of positions a, b and c in an accelerating direction and a plurality of operative positions a', b' and c' in a regenrative direction; a master reverser MR of a familiar type that is associated, in the customary manner, with a pair of actuating coils r' and f' of the main-circuit reversing switch RS; a plurality of electrical interlocking contact members of a familiar type that are associated with, and adapted to be actuated by, the various main-circuit switches in the familiar manner that is illustrated in Fig. 3 in connection with switch SW2. Inasmuch as the use of such interlock contact members is old and is well-known to those skilled in the art, it is not deemed necessary to illustrate all of the main-circuit switches in conjunction with all of the corresponding interlocking contact members, and it is thought that the illustration of Fig. 3 will be sufficient for the purposes of the present specification.

The anxiliary governing system also comprises a suitable source of energy, such as a battery B, and a pair of actuating coils associated with the change-over switch COS and adapted to electrically control its movements to the accelerating or regenerating position, in accordance with the legends marked upon them. In addition to the "series relay" and the "multiple relay" already mentioned and which are adapted to perform circuit functions hereinafter described, a "multiple auxiliary relay" is also used in connection with the "multiple relay", having its actuating coil in series-circuit relation with the auxiliary contact members of the latter across the battery B.

Assuming that the master controller MC1 is moved to its final operative position c, the complete automatic accelerating operation of the system shown may be set forth as follows:

A circuit is first established from the positive terminal of the battery B, through conductor 50, control fingers 51 and 52, which are bridged by contact segment 53 of the master controller, conductor 54, contact segment 55 of the master reverser MR in its forward position, conductor 56, contact segment 57 of the reversing switch RS in its forward position, conductors 58, 59, 60, 61 and 62, the actuating coil of the switch LS1, conductors 63 and 64, interlock PK1—a, interlock COS—Acc., conductors 65, 66 and 67, contact member 68 of the change-over switch COS in its accelerating position, conductor 69, control finger 70, contact segments 71 and 72 and control finger 73 of the master controller, and conductor 74 to the negative terminal B— of the battery B. As soon as the switch LS1 is closed, its actuating circuit is transferred through an interlock LS1—in directly to the conductor 65 through conductor 65a.

Another circuit is simultaneously established from conductor 58, through conductor 56a, interlock J—out, conductor 57a, interlock M2—out, the actuating coil of the switch JR, interlock COS—Acc., and conductor 58a to the negative conductor 66. The motors are thus connected in series-circuit relation with the accelerating resistors AR1, AR2 and AR3 across the supply circuit. The circuit connections just described correspond to the position a of the master controller, and no further acceleration would occur were the master controller not to be moved to a subsequent position.

Figure 5:
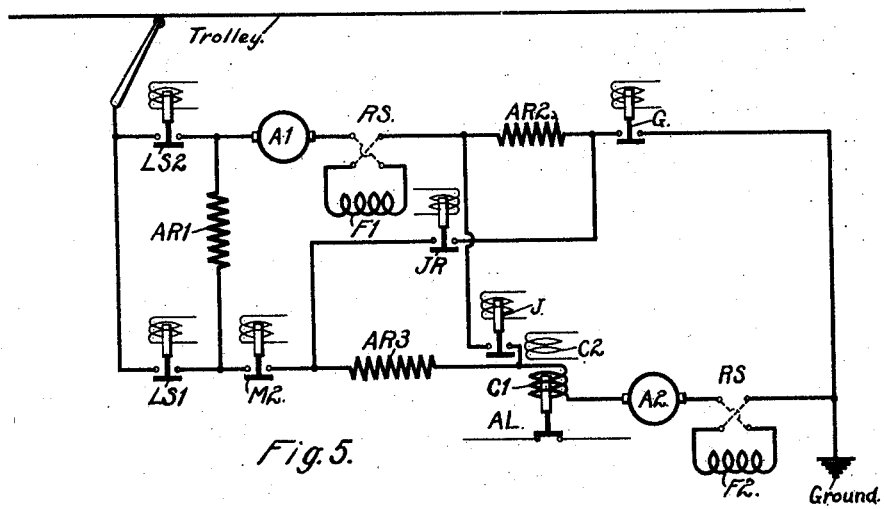

The general arrangement of motor circuits is illustrated in a simplified manner in Fig. 5.

However, when the master controller occupies its position b or c, the automatic operation is further continued by the establishment of a circuit from the contact segment 53 of the master controller, through a control finger 75, conductor 76, interlock G—out, conductor 77, interlock LS1—in, the auxiliary contact member 78 of the limit switch AL, conductor 79, interlock 80—COS—Acc., conductor 81, interlock 82—LS2—out, conductors 83 and 84, the actuating coil of the switch LS2, conductor 63, interlock LS1—in, and conductor 65 to the negative conductor 66.

Another circuit is established at this time from conductor 83, through conductor 85, the actuating coil 40 of the controller PK1, interlock J—out, conductors 86, 87 and 88, interlock PK1—a and thence to the negative conductor 66, as already described. Moreover, provided the limit switch AL has dropped to its lower position, further circuit is established through the auxiliary contact members thereof, as already described, to the conductor 81, whence circuit is completed through interlock 89—LS2—in, conductors 90, 91 and 91a, contact member 92—PK1—a to d, conductor 92a, interlock 93—JR—in, conductor 93a, interlock 94—SW1—out and the actuating coil 41 of the controller PK1 to interlock J—out and conductor 86, as already set forth.

As soon as the switch LS2 is closed, a holding circuit for its actuating coil is formed to include interlock 82—LS2—in and conductor 61a, which is connected to the energized conductor 60.

The two actuating coils of the controller PK1, being thus simultaneously energized, the controller is actuated to its initial operative position b to bring a contact member 42 of the controller into engagement with a plurality of control fingers that are associated with the resistor AR2, thereby short-circuiting one section thereof. As soon as the controller reaches its position b, the limit switch will have lifted, thereby temporarily preventing further operation of the controller. The controller PK1 is thus moved step-by-step, in accordance with the limit switch AL, to its position e, thereby gradually excluding the resistors AR2 and AR3 from circuit. The circuit connections at that time correspond to the position b of the master controller, or, in other words, full-series connection of the motors.

However, with the master controller occupying its position c, a circuit is next established from the contact segment 53, through control finger 95, conductors 96 and 97, contact member 98—PK1—e to g, interlock COS—Acc., interlock G-out, the actuating coil of the switch J and conductor 99 to the negative conductor 66. The actuating coil of the switch JR and the actuating coils 40 and 41 of the controller PK1 are deënergized upon the closure of the switch J by reason of the exclusion from their control circuits of the respective interlocks J-out. The two actuating coils of the controller PK1 being thus simultaneously deënergized, the drum returns to its off-position a.

When the limit switch AL has again dropped, a further circuit is completed through its auxiliary contact members to the conductor 90, as already described, and thence through conductor 100, interlock COS—Acc., conductor 101, interlock PK1—a, interlock M2—out, conductor 102, interlock JR—out, the parallel-connected actuating coils of the switches M2 and MG, conductor 103, interlock COS—Acc., and conductor 104 to conductor 87, whence circuit is completed as already set forth. Upon the closure of the switches M2 and G, the circuit of their actuating coils is transferred through interlock M2—in and conductor 101a to conductor 108. The closure of the switch G effects the opening of the switch J by reason of the exclusion of the interlock G—out from the energizing circuit of its actuating coil. The motors have thus been brought to the initial parallel position by means of the familiar bridging transition method, and the resistors AR2 and AR3 are again actively connected in the circuits of the respective motors.

The opening of the switch J allows the energization of the actuating coil 40 of the controller PK1 through interlock J—out, as hereinbefore described. The other actuating coil 41 of the controller PK1 is also simultaneously energized, from the conductor 91, through conductor 105, interlock JR—out and conductor 93a, as already described. The controller PK1 is thus successively actuated through its various operative positions in accordance with the limit switch AL, the energization of the actuating coil 41 being continued beyond the position e of the controller PK1 by reason of the substitution for the contact member 92 of the interlock JR—out.

When the controller PK1 reaches its position f, a contact member 44 (Fig. 1) is adapted to effect the exclusion from circuit of a portion of the main field winding F1, and a contact member 45 is adapted to perform a similar office, when the controller reaches its final operative position g, in connection with the field winding F2. The well known "field-control" is thus effected to produce a further accelerating step of the motors, as will be understood.

The regenerative operation of the system will now be described. The general function of the relays respectively marked "Series relay", "Multiple relay" and "Multiple auxiliary relay" may first be pointed out to advantage, and the specific connections effected by them will be described later in connection with the regenerative operation. However, the use of such relays in a system of control is not of our present invention, but is shown and described and claimed in a co-pending application of Arthur J. Hall, which has matured into Patent No. 1,278,143, issued Sept. 10, 1918, and assigned to the Westinghouse Electric & Manufacturing Company. The series relay is adapted to act at a relatively low voltage, for example, 200 volts, to effect the connection of the machines in series relation across the supply circuit, provided the speed of the machine is so low that it would be impossible to effect regeneration by parallel connection of the machines. On the other hand, the multiple relay and multiple auxiliary relay in conjunction are adapted to connect the motors in initial parallel-circuit relation across the supply-circuit, provided with the voltage of each motor is sufficient to individually effect regenerative operation to the supply circuit. By the use of both the multiple relay and the multiple auxiliary relay in conjunction, the operation of the circuits governed by them is delayed slightly behind the operation of the circuits that are governed by the series relay whereby, in case of relatively low speeds of the momentum-driven machines, the series relay will act first to effect the series connection of the machines before the multiple relay has an opportunity to effect its circuit changes. In other words, if the multiple relays are actuated, although the series relay is of necessity also operated, the momentum-driven machines are initially connected in parallel-circuit relation; the PK2 drum is then automatically operated, in accordance with the limit switch AL, to effect a gradual short-circuit of the resistors R1 and R2 as the machine speeds decrease; the machines are then automatically changed over to series-circuit relation, with the resistors R1 and R2 initially in circuit; and these resistors are then again gradually short-circuited as the speeds of the machines still further decrease. However, in case conditions are such that parallel regenerative operation of the machines is impracticable, the series relay alone acts, whereby the control drum PK2 is immediately moved through positions that correspond to parallel operation of the machines to the initial position that corresponds to the series relation thereof, and the remaining operation of the system is the same as before.

Assuming that conditions are suitable for parallel regenerative operation of the machines; the master controller MC may be first moved to its final operative position c', whereby a circuit is first established from the positive terminal of the battery B, through the master controller in its position c' and the master reverser in its forward position, and to the conductor 56a, as described in connection with acceleration, and thence, through conductor 67a, interlocks PK2—a PK1—a, SW2—out and LS1—out, the actuating coil of the change-over switch COS that corresponds to regenerative operation, contact segment 68ª of the change-over switch in its accelerating position, conductor 69a, control fingers 70a and 73, which are bridged by contact segment 71a of the master controller, and thus to the negative terminal of the battery B. The change-over switch COS is thus actuated to its position corresponding to regenerative operation wherein the circuit just described is broken at the contact segment 68a.

Another circuit is then established from conductor 56a, through conductor 106, the parallel-connected actuating coils of the switches FC, SW2 and SW1 and the actuating coil 40 of the controller PK2, conductor 107, interlock COS—Reg., conductors 58a and 66 and the contact member 68a of the change-over switch to the battery B, as already described.

The closure of the switch FC effects the inclusion of the field-magnet winding MFb of the motor-generator or dynamotor in the circuit thereof. It will be understood that this motor-generator or dynamotor may be employed during acceleration of the main motors for the purpose of supplying energy to the various auxiliaries employed upon the car, such as the lighting and the control system, if desired, and may also be used to mechanically drive an air-compressor, in accordance with familiar practice. However, in such a case, it has been found to be of advantage to increase the field excitation of the motor-generator or dynamotor during regenerative operation of the main machines, and this increased excitation is obtained by the closure of the switch FC as just described.

Figure 6:
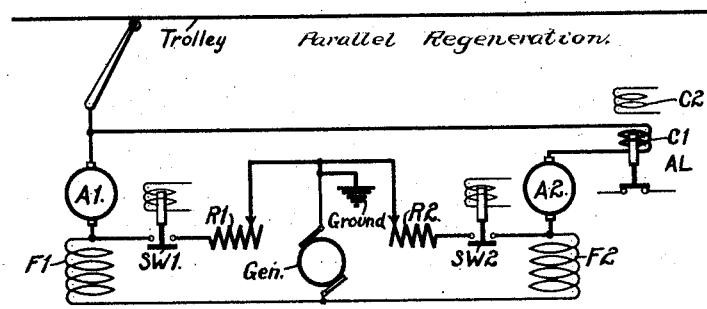
Figure 7:
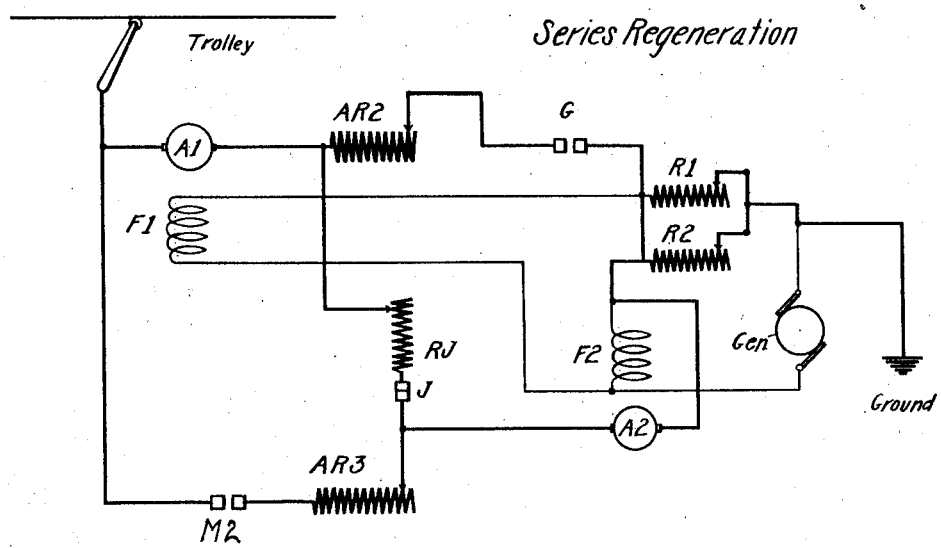

The closure of the switches SW1 and SW2 effects the connection of the generator-armature winding Gen. through the resistors R1 and R2, respectively, to the field magnet windings F1 and F2, as illustrated in a simplified manner in Fig. 6.

Another circuit is simultaneously established from conductor 56a, through conductor 108 and 109, contact member PK2—a' to g', conductors 110 and 111, the auxiliary contact members 112 of the multiple auxiliary relay in its upper position, the actuating coil of which has been energized through the closure of the multiple relay, as already mentioned, conductor 113, interlock COS—Reg., conductor 101, thence through the actuating coils of the switches M2 and G, as already set forth, conductor 103, interlock J—out and conductor 104 to the negative-circuit conductor 66, as hereinbefore described.

A further circuit is established from the master controller, through the actuating coil of the switch LS1, as set forth in connection with the acceleration of the motors, to the interlock PK1—a, whence its circuit is completed through conductor 114, the auxiliary contact members 115 of the multiple auxiliary relay in its upper position, conductor 116 and conductor 65a to the negative conductor 66. The momentum-driven machines at this time are connected in parallel relation, while the generator armature winding G is connected through the resistors R1 and R2, respectively, to the field windings F1 and F2. (See Fig. 6.)

Another circuit is simultaneously established from the conductor 60, through conductor 118, interlock COS—Reg., conductor 81 and the interlock 82—LS2—out to the actuating coil of the switch LS2 and thence, through the interlock PK1—a, as already described in connection with the switch LS1. The circuit connections just described correspond to the position a' of the master controller, and no further regenerative operation would occur if the master controller were not moved to one of its subsequent positions.

Provided that the limit switch AL has dropped to its lower position, circuit is next established from contact segment 53a of the master controller in position b' or c', through control finger 75, conductor 76, contact member 119 of the controller PK2 in its off position a', conductor 77, interlock LS1—in, the auxiliary contact member 78 of the limit switch AL, conductor 79, interlock COS—Reg., conductors 120 and 121, the actuating coil 41 of the PK2 controller, interlock SW1—in and conductor 122 to the negative conductor 66. Both actuating coils of the PK2 controller being thus simultaneously energized, a step-by-step movement of the controller, in accordance with the operation of the limit switch AL will occur.

The circuit location of the series actuating coil C1 has already been described. The second or shunt actuating coil C2 is connected across the field winding F2 by contact segment 119a when the controller PK2 occupies positions d' to f', inclusive, and by contact segment 119b when the controller occupies positions l' to n', inclusive. Thus, the limit switch AL is normally actuated in accordance with the current traversing the armature A2 and is also energized in accordance with the current traversing the field winding F2 during the latter portion of both the parallel and the series regenerative operation. Thus, by suitable design of the actuating coils, the regenerated or armature current may be varied, if desired, substantially inversely to the field winding current, whereby an approximately constant braking effort of the machines is maintained throughout the regenerative period, as explained below.

The regenerated current is relatively heavy under initial braking conditions when the field-winding excitation is at its minimum and the regenerated current is comparatively light toward the end of each braking period when the field-winding current is heavy. Consequently, the limit switch AL may be readily designed to operate, in accordance with the conditions just mentioned, to gradually exclude the resistors R1 and R2 from circuit and thus decrease the regenerated current as the field-winding current is increased during the retardation period.

Taking a specific example, assume a total armature and field current amounting to $20.6x$ amperes. Keeping this sum constant and varying the armature currents inversely in the ratio of 1 to 2, the following table of relative values may be derived:

| Armature current. | Field current. | Sum. | Product—proportional to torque. |
|---|---|---|---|
| 13.7$x$ | 6.9$x$ | 20.6$x$ | 94$x^2$ |
| 12.6$x$ | 8$x$ | 20.6$x$ | 101$x^2$ |
| 11.6$x$ | 9$x$ | 20.6$x$ | 104$x^2$ |
| 10.6$x$ | 10$x$ | 20.6$x$ | 106$x^2$ |
| 9.6$x$ | 11$x$ | 20.6$x$ | 106$x^2$ |
| 8.6$x$ | 12$x$ | 20.6$x$ | 103$x^2$ |
| 7.6$x$ | 13$x$ | 20.6$x$ | 99$x^2$ |
| 6.8$x$ | 13.8$x$ | 20.6$x$ | 94$x^2$ |

It is seen, therefore, that the above product varies only 6% from an average value of $100x^2$; or, in other words, the torque or braking effort in the present system is held approximately constant as the limit switch AL is actuated in accordance with the combined and inversely varying armature and field currents.

The controller PK2 is actuated, in a step-by-step manner already described, to the position $f'$ which corresponds to full-parallel relation of the regenerating machines and to position $b'$ of the master controller, the resistors R1 and R2 having been gradually short-circuited, as the controller is moved, in accordance with the operation of the limit switch AL, to maintain a substantially constant regenerative torque, as will be understood. Provided the master controller occupies its position $c'$, the energization of the actuating coil 41—(PK2) is maintained until the switch G opens, and the interlock G—out thus becomes operative through contact segment 53$a$, control finger 95, conductor 96, control finger 96$a$ and contact segment 119.

As soon as the controller PK2 occupies its position $g'$, the short-circuits of the resistors R1 and R2 are removed. Also, a control circuit is established from the conductor 56$a$, through conductor 125, contact member 126—PK2—$g'$ and $h'$, auxiliary contact members 127 of the series relay in its upper position, the actuating coil of the switch J and conductor 99 to the negative conductor 66.

In order to prevent a path of relatively low resistance being connected across the supply circuit by the closure of the switch J at the time that the other switches, already mentioned, are closed, the transition resistor RJ is employed in series-circuit relation with the switch J. As illustrated in Fig. 1, when the controller PK2 occupies its position $g'$, the entire resistor RJ is connected in circuit and, in the two succeeding positions $h'$ and $i'$, the resistor is gradually short-circuited, the switches M2 and G having been opened immediately upon the closure of the switch J by reason of the exclusion of the interlock J—out from the control circuit of the actuating coils. When these switches have been opened, there is no longer any danger of a short-circuit connection, and, consequently, the resistor RJ may be excluded from circuit.

Moreover, upon the occupation of position $g'$ by the controller PK2, contact segment 123 thereof (Fig. 1) engages control finger 124, whereby the hitherto separated ends of the resistors R1 and R2 are connected to dispose the resistors in parallel-circuit relation, it being found that a lesser variable circuit resistance is desirable during series regeneration.

At this time, therefore, the regenerating armatures are connected in series-circuit relation, with the parallel-connected resistors R1 and R2 actively in circuit (see Fig. 7). The further step-by-step automatic actuation of the controller PK2 again effects the gradual short-circuit of the resistors R1 and R2 to maintain a substantially constant braking effort to a relatively low vehicle speed.

Assuming, now, that the speed of the momentum-driven motors is unsuitable for setting up parallel regenerative operation, but that the initial voltage induced in the armatures of the machines through the energization of their field by the generator armature winding Gen. is equal to 200 volts or any other predetermined value that is suitable for series regeneration, the operation of the system, upon the actuation of the master controller to its position $c'$, may be set forth as follows:

The switches FC, SW2 and SW1 are closed and the actuating coil 40 of the controller, PK2 is energized, as already related in connection with the multiple regeneration of the machines. Simultaneously, another circuit is established from conductor 108, through conductor 109, contact member PK2—$a'$ to $g'$, conductor 110, auxiliary contact members 128 of the multiple auxiliary relay in its lower position, interlock PK1—$a$ and conductors 130 and 121 to the actuating coil 41 of the controller PK2.

The controller PK2 is thus rapidly moved to its position $h'$, whereby the circuit just traced is broken at the interlock PK2—$a'$ to $g'$. However, the energization of the actuating coil 41—(PK2) is maintained as far as position $j'$ through the agency of the previously-traced circuit including the auxiliary contact members 78 of the limit switch AL, the circuit being otherwise as already described in connection with multiple regeneration. The switches M2 and G are prevented from closing by reason of the exclusion of the auxiliary contact members 112 of the multiple auxiliary relay from the circuit of their actuating coils.

At the same time, the actuating coil of the switch LS1 is energized from the master controller, in the manner already related, to the conductor 64, whence circuit is now completed through conductors 88 and 131, auxiliary contact members 132 of the series relay in its upper position, conductor 133, contact-member 134—PK2—$g'$ to $n'$, and conductor 135 to the negative conductor 66. The switch LS2 is then closed, as soon as the limit switch AL has dropped to its lower position, through the circuit already traced in connection with the multiple regeneration of the machines. The switch J is also brought in as soon as the PK2 controller occupies the position $g'$, in the manner already described in connection with the transition of the machines from parallel to series relation. The energizing circuit of the actuating coil 41 of the PK2 controller is then transferred through the auxiliary contact members 78 of the limit switch AL, as hereinbefore described, and the PK2 controller, from that time on, is actuated in accordance with the operation of the limit switch AL, and in exactly the same manner as that set forth in connection with the latter or series portion of the regenerative operation hereinbefore described.

It will be observed that one of the most advantageous features of the automatic system just described is the combination of means for inherently imparting to the regenerating machines a negative compound characteristic and limit-switch controlled means for varying the regenerated current of the machines, as their speed decreases, to maintain a substantially constant braking effort. The term "negative compound characteristic" signifies the inherent tendency of the main machines to decrease in field-winding excitation upon an increase of regenerated or main-armature current, and vice versa. Such action is effected by the traversal of both regenerated and exciting currents through the stabilizing resistor R1, for example, in the same direction. Thus, upon an incipient increase of regenerated current, the voltage drop across the resistor R1 is correspondingly augmented, which inherently decreases the voltage available for delivery from the exciting generator to the main field windings. In this way, the desired stabilizing excitation effect is inherently produced, as more fully set forth in a co-pending application of R. E. Hellmund, Serial No. 44,443, filed August 9, 1915, and assigned to the Westinghouse Electric & Manufacturing Company, which application has matured into Patent No. 1,298,706, granted April 1, 1919. The advantages of the negative compound characteristic that is provided in the system, such as the instaneous regulating action and the elimination of relay-controlled or other devices, which have been used in the prior art, are evident.

Referring now to Fig. 4, the modified portion of the system that is shown in Fig. 2 comprises a contact segment 119c of the controller PK2 that replaces the contact segments 119, 119a and 119b; and a limit switch AL1, which is provided with a series actuating coil C3 and a second or shunt coil C4 that respectively correspond to actuating coils C1 and C2 of the limit switch AL. However, the shunt coil C4 is adapted for energization from the storage battery B or some other suitable source of energy by the completion of a circuit from the battery through the master controller, (not shown in Fig. 4) conductor 76, contact segment 119c, control finger 140, the actuating coil C4 and the negative conductor B—. The control finger 140 engages the contact segment 119c in positions $a'$ and $b'$, $e'$ and $f'$, and $l'$, $m'$ and $n'$, for the reasons about to be set forth. It will be understood that the operation of the limit switch AL1 in general is similar to that of the limit switch AL since, whenever the auxiliary coil C4 is energized, the limit switch AL1 will drop at a lower armature-current value than when the series coil C3 alone is active, whereby a lower average armature current is produced by the use of the two actuating coils.

The proper periods for employing the auxiliary coils for either the limit switch AL or the switch AL1 are dependent chiefly upon the characteristics of the motors that are used. If the motors are designed to be relatively stable under load fluctuations, that is, if the motors are not liable to "flash-over", the arrangement that is shown in Fig. 2, wherein the auxiliary coil C2 is employed during only the latter portions of parallel and of series regenerative operation, is preferable. However, in case the motors are not so reliable with respect to the possibility of "flash-over" conditions, then the arrangement of limit-switch auxiliary coils that is shown in Fig. 4 should be employed, wherein the initial and final portions of the parallel regenerative period and the final portion of the series regenerative period employ both coils of the limit switch. In such a case, the rate of deceleration is initially sacrificed somewhat but the probability of "flash-over" conditions is substantially precluded, and, in general, the braking effort of the machine is maintained approximately constant throughout the entire regenerative operation.

It will be understood that our invention is not limited in its application to the particular regenerative system that has been shown and described but that any other well-known type of regenerative system may utilize the benefits of our present invention.

It should also be observed, that, if desired, the limit switches may be designed to employ an auxiliary or shunt coil that is adapted, when energized in certain positions of the controller PK2, to oppose the action of the series coil and thus produce substantially the same effects as the shunt actuating coils that are illustrated. Moreover, another obvious modification comprises the use of two or more limit switches that are adjusted to operate at different current values and that are made operative successively to perform the desired function, as will be understood.

One point that should be borne in mind is the fact, that, because of saturation in the field structure polar projections or other portions of the magnetic circuit, the exciting field strength, that is, the amount of working field flux that is cut by the armature conductors, does not vary at all times in accordance with the field-winding current; consequently, the operation of the governing relay devices should be adjusted to compensate for such effects, since the braking torque is proportional to the product of armature current and working field flux.

We do not wish to be restricted to the specific circuit connections or location and arrangement of parts herein set forth, as various modifications thereof may be effected without departing from the spirit and scope of our invention. We desire, therefore, that only such limitations shall be imposed as are indicated in the appended claims.

We claim as our invention:

1. In a system of control, the combination with a dynamo-electric machine adapted for regenerative braking, of means for controlling said machine to regulate the braking effort thereof, and relay means governing the operation of said controlling means adapted to be connected to respond to electrical quantities of the system which are factors of the machine torque, said controlling means being arranged to affect the circuit connections of said relay means.

2. In a system of control, the combination with a dynamo-electric machine adapted for regeneration and having an armature and a field-magnet winding, of means responsive to regenerated current for simultaneously and automatically varying said current and the field excitation of said machine so as to regulate its braking effort disproportionately to the exciting strength of said field winding.

3. In a system of control, the combination with a dynamo-electric machine adapted for regeneration and having an armature and a field-magnet winding, of single relay means for governing the machine operation normally energized in accordance with the armature current and intermittently energized also in accordance with the field-winding current.

4. In a system of control, the combination with a dynamo-electric machine adapted for regeneration and having an armature and a field-magnet winding, of relay means normally energized in accordance with the armature current and energized also in accordance with the field-winding current during the latter portion of the regenerative period.

5. In a system of control, the combination with a plurality of dynamo-electric machines severally having armatures and field-magnet windings and adapted for initial parallel and subsequent series regenerative operation, of relay means normally energized in accordance with the armature current and energized also in accordance with the field-winding current during the latter portions of the parallel and the series regenerative operation, whereby the braking effort of the machines is regulated disproportionately to the field-winding current.

6. In a system of control, the combination with a dynamo-electric machine adapted for regeneration and having an armature and a field winding, of relay means for governing the machine operation responsive to a lower armature current under relatively low-speed conditions than under higher-speed conditions.

7. In a system of control, the combination with a dynamo-electric machine adapted for regeneration and having an armature and a field winding, of relay means normally energized in accordance with the armature current and energized also in accordance with the field-winding current, under low-speed conditions, to render the relay means responsive to a relatively low armature current.

In testimony whereof, we have hereunto subscribed our names this 29th day of Jan., 1916.

NORMAN W. STORER.
RUDOLF E. HELLMUND.